United States Patent
Tan et al.

(10) Patent No.: US 7,760,186 B2
(45) Date of Patent: Jul. 20, 2010

(54) OPTICAL MOUSE THAT AUTOMATICALLY ADAPTS TO GLASS SURFACES AND METHOD OF USING THE SAME

(75) Inventors: Shan Chong Tan, Island Glades (MY); Sai Mun Lee, Sg Nibong (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1130 days.

(21) Appl. No.: 11/397,194

(22) Filed: Apr. 4, 2006

(65) Prior Publication Data
US 2007/0229461 A1  Oct. 4, 2007

(51) Int. Cl.
*G06F 3/033* (2006.01)
(52) U.S. Cl. ...................................... 345/166
(58) Field of Classification Search ......... 345/156–167, 345/179
See application file for complete search history.

(56) References Cited

U.S. PATENT DOCUMENTS 7,483,018 B2 *  1/2009  Oliver ........................ 345/166
2005/0083303 A1 *  4/2005  Schroeder et al. ............ 345/166
2005/0168445 A1 *  8/2005  Piot et al. .................... 345/163
2005/0190157 A1 *  9/2005  Oliver et al. ................. 345/166
2005/0195163 A1 *  9/2005  Grewal et al. ................ 345/157
2007/0008286 A1 *  1/2007  Theytaz et al. .............. 345/166
2007/0139381 A1 *  6/2007  Spurlock et al. ............. 345/166

* cited by examiner

*Primary Examiner*—Chanh Nguyen
*Assistant Examiner*—Allison Walthall

(57) ABSTRACT

A pointing device and method for using the same are disclosed. The pointing device includes an illumination system, an imaging system, and a controller. The illumination system illuminates a portion of a surface over which the pointing device travels with coherent light. The imaging system includes a first window for receiving light from the illuminated portion of the surface and transmitting that light to a first imaging array such that a speckle pattern is generated on the first imaging array and a second window includes an imaging optical system for forming an image of part of the illuminated portion of the surface on a second imaging array. The controller selects either the first imaging array or the second imaging array and compares the output of the selected imaging array at first and second times to determine a displacement indicative of the direction and distance the pointing device moved.

11 Claims, 3 Drawing Sheets

OPTICAL MOUSE THAT AUTOMATICALLY ADAPTS TO GLASS SURFACES AND METHOD OF USING THE SAME

BACKGROUND OF THE INVENTION

A common form of pointing device for use with computers and the like is referred to as a "mouse". The computer user moves the device over a surface to move a cursor on the computer screen. The amount and direction of motion of the mouse are sensed by the device and determine the distance and direction in which the cursor moves on the screen. Inexpensive mice based on a ball that rolls over the surface have been used for some time. The ball turns two cylinders that sense the distance and direction of motion. Unfortunately, the ball picks up grease and other dirt from the surface and transfers this material to the cylinders. The resulting coating on the cylinders interferes with the motion of the cylinders, and hence, the devices must be cleaned periodically. The cleaning operation is awkward and time consuming. In addition, the numerous mechanical assemblies included in the device increase the cost of assembly.

Mice based on optical sensing avoid this problem. Originally, such mice had to be moved over a special pad that had grid lines that were sensed by the device. The need to use this special pad made these devices less attractive than the mechanical mice discussed above. More recently, optical mice that do not require such pads have been developed. These mice include a light source that illuminates the surface under the mouse at a shallow angle, which accentuates the structural details of the surface. An image sensor in the mouse records an image of the illuminated surface periodically. By comparing two successive images, the displacement of the mouse between the times at which the images were taken can be determined.

Unfortunately, this type of optical mouse does not function properly on a glass-covered surface such as the glass tops used on many desks or other work surfaces. The glass covers are used to protect the underlying surface. The top surface of the glass is too smooth to provide an image that has sufficient structure to measure the displacement of the mouse. While the surface under the mouse may have the required structure, the imaging sensor and optics in the mouse do not provide an in-focus image of the underlying surface. Hence, traditional optical mice have not been useable on many glass-covered desktops.

One solution to the out-of-focus image problem discussed above is described in co-pending U.S. patent application Ser. No. 10/404,252. In that patent, the mouse is provided with a spacer that alters the focal plane of the imaging system in the mouse. When a user wishes to employ the mouse on a glass surface, the user changes the spacer manually to alter the distance from the focal plane of the optical system to the image sensor. The mouse can then operate using the surface under the glass plate.

While this solution represents a significant improvement over conventional optical mice, it still has a number of problems. First, the user must adjust the distance between the sensor and the underlying glass plate by an amount that compensates for the thickness of the glass plate. This places the burden of adapting the mouse on the user who may not have the required level of expertise.

Second, this solution only works if the surface below the glass surface has sufficient detail. If the underlying surface is too smooth, even this solution will not provide adequate structure to allow the mouse to function. In this regard, it should be noted that the intervening glass plate decreases the signal-to-noise ratio in the image due to reflections at the glass boundaries. Hence, the minimum degree of structure in the underlying surface must be greater than that needed by an optical mouse that is not operating through a glass plate.

SUMMARY OF THE INVENTION

The present invention includes a pointing device and method for using the same. The pointing device includes an illumination system, an imaging system, and a controller. The illumination system illuminates a portion of a surface over which the pointing device travels with coherent light. The imaging system includes a first window for receiving light from the illuminated portion of the surface and transmitting that light to a first imaging array such that a speckle pattern is generated on the first imaging array and a second window includes an imaging optical system for forming an image of part of the illuminated portion of the surface on a second imaging array. The controller selects either the first imaging array or the second imaging array and compares the output of the selected imaging array at first and second times to determine a displacement indicative of the direction and distance the positioning device moved between the first and second times. In one aspect of the invention, the choice of imaging array is made by determining the level of detail in the image formed on the second imaging array.

DETAILED DESCRIPTION OF THE PREFERRED EMBODIMENTS OF THE INVENTION

Figure 1:
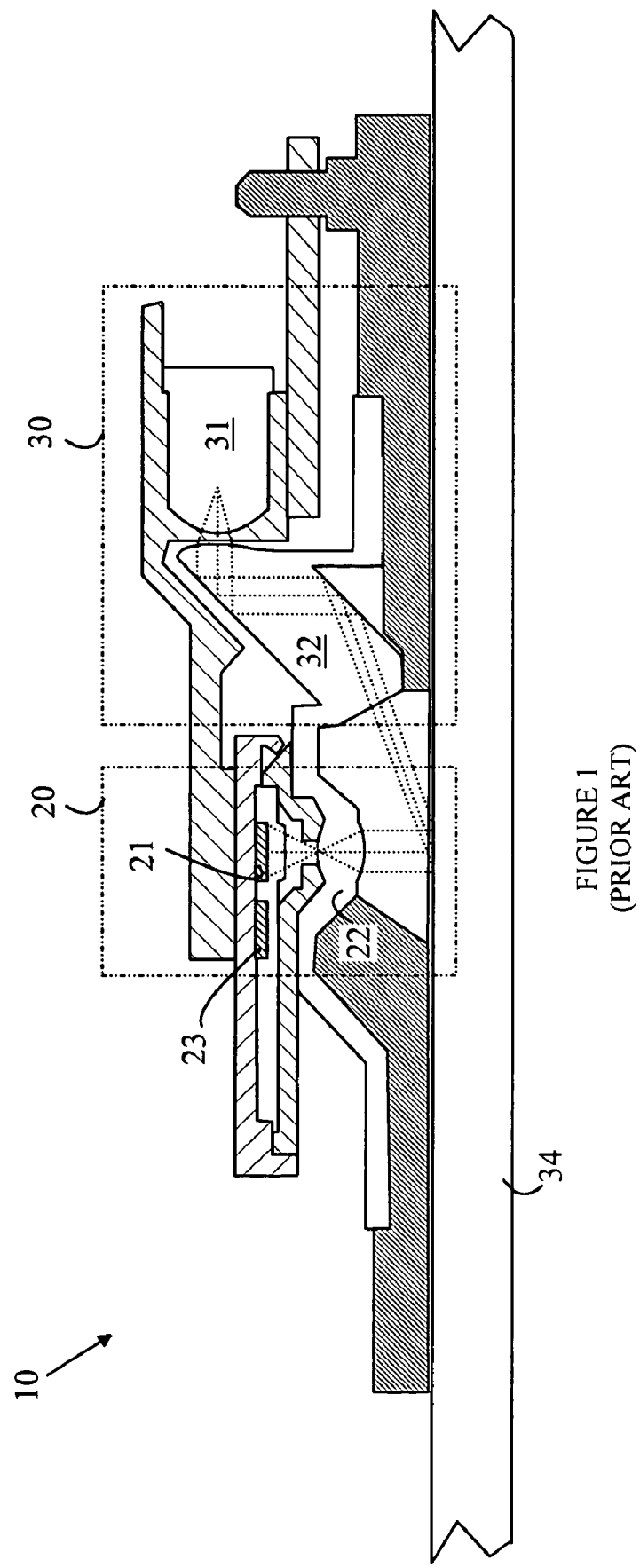
FIG. 1 is a simplified cross-sectional view of a prior art optical mouse that moves over an opaque substrate.
Figure 2:
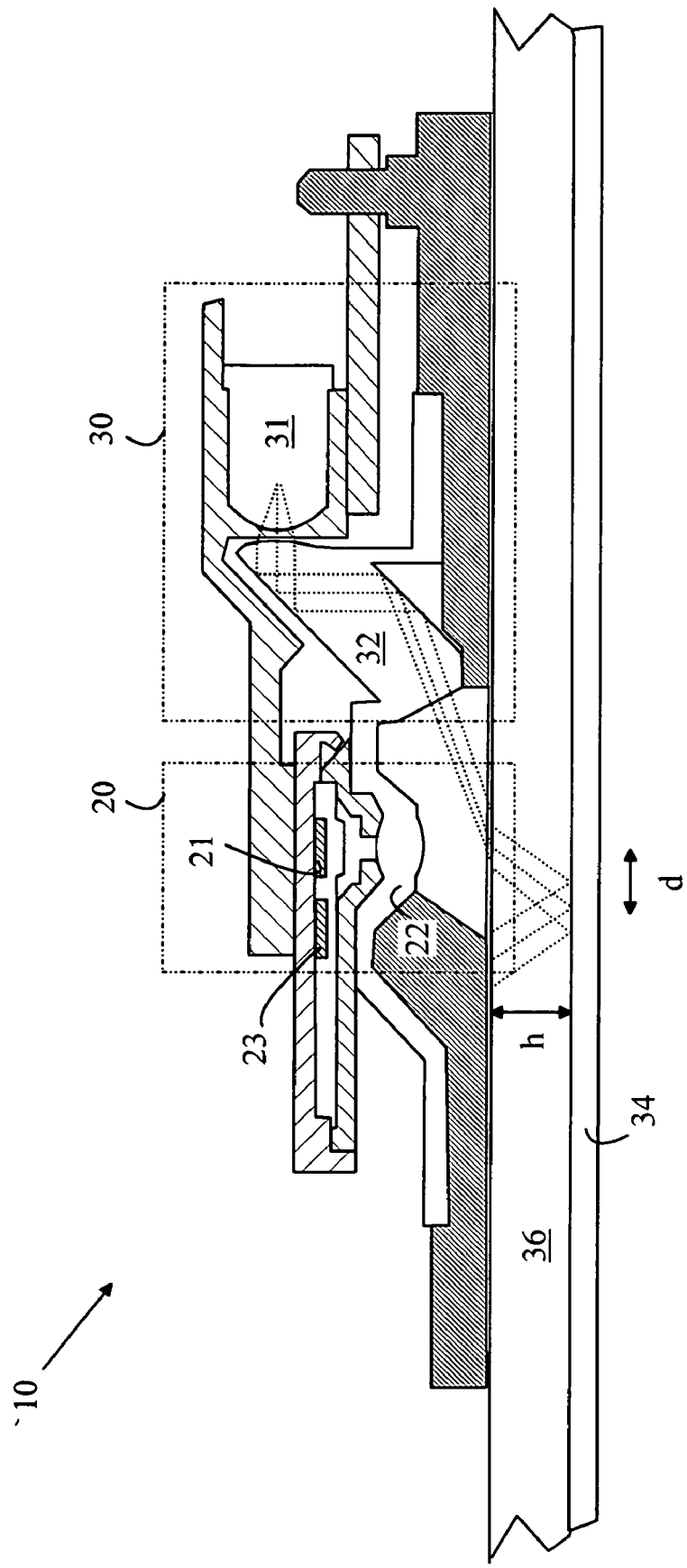
FIG. 2 is a cross-sectional view of the mouse shown in FIG. 1 with a glass plate between the mouse and the navigation surface.

The manner in which the present invention provides its advantages can be more easily understood with reference to FIGS. 1 and 2. FIG. 1 is a simplified cross-sectional view of a prior art optical mouse 10 that moves over an opaque substrate 34. Mouse 10 may be viewed as having two principal components, an illumination section 30 and an imaging section 20. Illumination section 30 typically includes a light source 31 and an optical assembly 32 that illuminates surface 34 with collimated light that strikes the surface at a shallow angle relative to the surface. The light source is typically an LED. Light from the illuminated portion of the surface is imaged by the imaging section onto a sensor 21 with the aid of a lens assembly 22. Sensor 21 is a two-dimensional array of imaging elements that forms an image of a portion of surface 34.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

Refer now to FIG. 2, which is a cross-sectional view of mouse 10 with a glass plate 36 between mouse 10 and surface 34. As noted above, such glass plates are often used as protective coverings on writing desks. The top surface of glass plate 36 is too smooth to provide a reflected image having sufficient structure to allow the above-described correlation algorithm to operate successfully. Hence, the light from light source 31 is refracted into the glass and illuminates surface 34 under the glass plate. This light is then reflected back toward the mouse. Unfortunately, the illuminated area is shifted laterally by an amount d and vertically by an amount h relative to the area illuminated in the absence of the glass plate. Hence, the imaging optics 22 fail to image the illuminated area on sensor 21 either because the area of interest is outside the field of view of the imaging optics or because the area of interest is no longer in focus. Accordingly, the mouse will not operate satisfactorily on such a surface.

The present invention is based on the observation that a scattering surface will generate a speckle pattern when illuminated with a coherent light source such as a laser. The speckle pattern is created on any surface placed above the scattering surface. Navigation systems based on speckle navigation are known to the art, and hence, will not be discussed in detail here. For the purposes of the present discussion it is sufficient to note that the pattern consists of bright and dark "spots". The bright spots result from light rays that strike the surface after traveling distances that are integral multiples of the wavelength of the laser light, and hence, constructively interfere with one another. The dark spots result from rays whose paths differ by an integral multiple of wavelengths plus a half of a wavelength.

If an imaging array is placed at a location that receives the speckle pattern, the speckle pattern can be used to provide an indication of the direction and magnitude of the mouse motion between frames. However, in practice, the performance of mice based on speckle pattern navigation is less than that of mice that utilize conventional navigation based on imaging the surface details of the scattering surface.

If a coherent light beam is incident on a smooth surface that is microscopically rough, high contrast intensity patterns produced by interference among the reflected and the scattered light may be observed in the reflected images. The interference effects provide enhanced contrast to the image for navigation.

It should be noted that this image must be viewed with an imaging lens. The speckle pattern discussed above, in contrast, is lost if an imaging lens is utilized.

The present invention is based on the observation that a dual navigation system mouse can be constructed such that the conventional navigation approach enhanced by the interference effects discussed above is utilized when the mouse moves over a scattering surface that is not covered by a transparent plate. When this system fails the navigation system utilizes a speckle navigation system.

As noted above, the speckle pattern is, in general, destroyed if an imaging lens is placed between the surface on which the speckle pattern is viewed and the scattering surface. Each point in the imaging plane of the lens receives light from a large number of different rays having different distances from the scattering surface to the imaging plane. Thus, the rays that would constructively combine are mixed with rays that destructively combine and other rays that traverse optical paths that result in partial constructive or destructive addition. Hence, the speckle pattern can be separated from the normal surface image by providing a path that lacks an imaging lens.

Figures 3, 4:
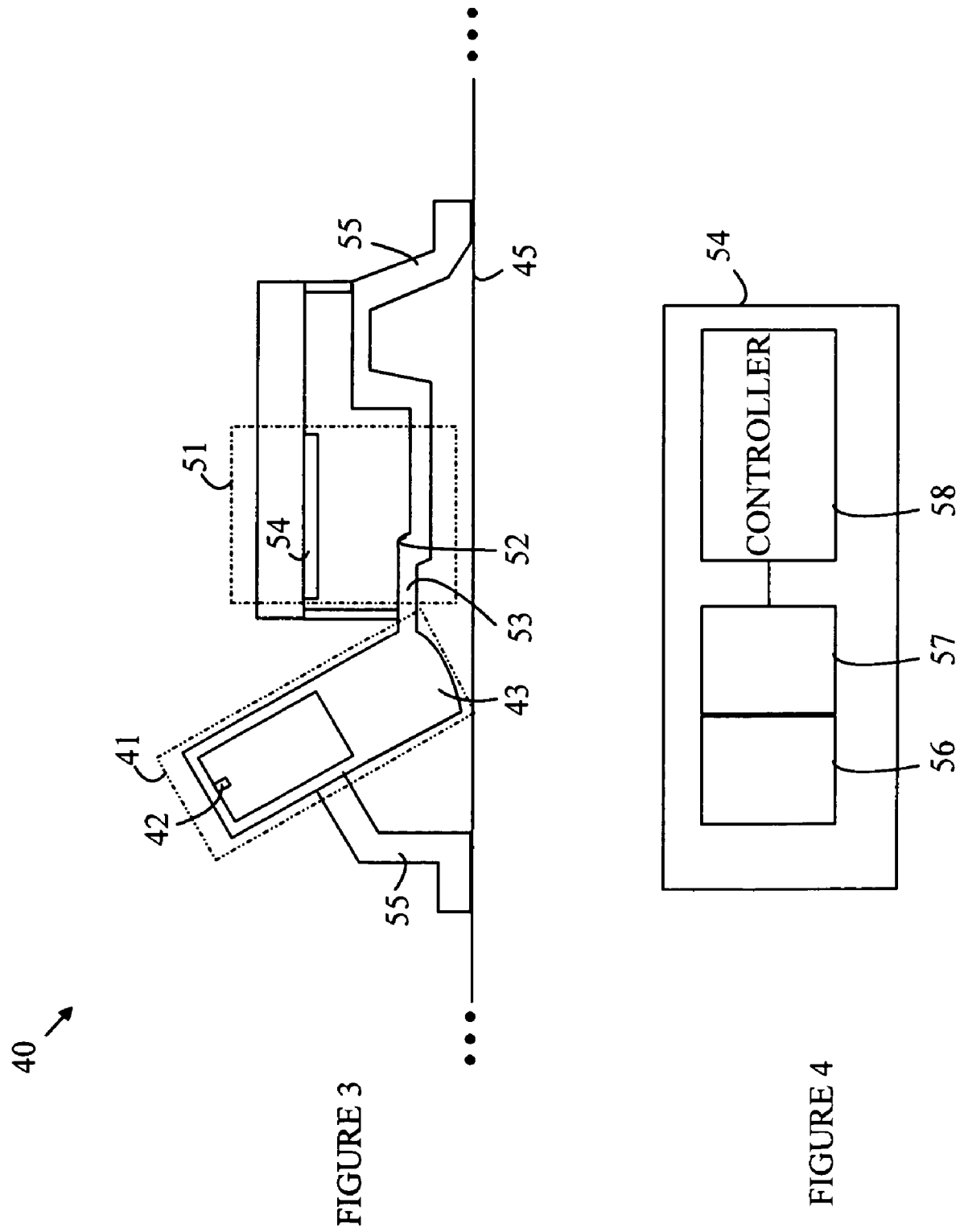
FIG. 3 is a cross-sectional view of a pointing device 40
FIG. 4 is a bottom view of the navigation sensor shown in FIG. 3.

Refer now to FIGS. 3 and 4, which illustrate one embodiment of a pointing device according to the present invention. FIG. 3 is a cross-sectional view of a pointing device 40, and FIG. 4 is a bottom view of navigation sensor 54 shown in FIG. 3. Pointing device 40 includes an illumination sub-system 41 and an imaging sub-system 51. These sub-systems are mounted in a housing 55 that positions the sub-systems at the proper height over a surface 45 on which pointing device 40 moves.

Illumination sub-system 41 includes a coherent light source 42 such as a VCSEL and an optical system 43 for illuminating an area of surface 45. Optical system 43 assures that the illuminated area on surface 45 is large enough to provide reliable navigation information for both navigation systems.

Imaging sub-system 51 includes a navigation sensor 54 that receives light from the illuminated area on surface 45 through a transparent window having a first region 53 that lacks an imaging lens and a second region 52 that images the light received by the second region onto a portion of navigation sensor 54. Regions 52 and 53 are typically formed from a transparent plastic medium by a molding operation that provides a lens at location 52.

Refer now to FIG. 4. Navigation sensor 54 includes first and second imaging arrays shown at 56 and 57, respectively, and a controller 58 that processes data from the imaging arrays. It should be noted that the pointing device might include other buttons or devices for signaling the device using the pointing device to take actions. To simplify the following discussions, such additional buttons or devices have been omitted from the drawings. It is sufficient to note that controller 58 can also process data from these devices and communicate that information to the device attached to the pointing device. It should also be noted that imaging arrays 56 and 57 could be different parts of a single larger imaging array.

Imaging array 56 is positioned to receive the speckle pattern, and imaging array 57 is positioned to receive the image of surface 45 generated by the lens in region 52. The image recorded in region 52 will be referred to as the "surface image" in the following discussion. Periodically, controller 58 utilizes one of the imaging arrays to form an image that is compared with a previous image from that array to determine the movement of pointing device 40 over the surface between the times at which the two images were taken. The determination is performed in the conventional manner, and hence, will not be discussed in detail here.

Controller 58 utilizes the surface image as seen by imaging array 57 to generate an output signal indicative of the movement of the pointing device if the surface image contains sufficient detail to provide a reliable measurement of the pointing device motion. If this image does not have sufficient detail, then controller 58 utilizes the speckle pattern images as seen by imaging array 56 to track the motion of the pointing device. In one embodiment, controller 58 still periodically checks the images from imaging array 57 to check on whether or not the detail in those images has returned to a sufficient level to allow navigation via the surface images even though controller 58 is navigating via the speckle pattern images provided by imaging array 56. If the images from imaging array 57 return to a level of detail in which these images can be utilized, then controller 58 returns to the mode in which controller 58 navigates via the surface images.

Alternatively, controller 58 can start in the first mode in which it utilizes the surface images and then switch to the second mode in which the speckle pattern images are used to navigate. In such an embodiment, pointing device 40 would remain in the second mode until pointing device 40 is reset by powering the device up or a predetermined time has expired.

In one embodiment of the present invention, the level of detail in the images formed by imaging array 56 is determined by extracting features from the image. Simple algorithms for extracting features from an image are known to the art, and hence, will not be discussed in detail here. In one embodiment, controller 58 counts the number of features in the image. If the number of features is greater than a predetermined value, the images are defined to have sufficient detail to allow the images to be utilized for navigation. If the surface over which pointing device 40 is traveling has sufficient structure and is in focus as seen by imaging array 56 then the number of distinct features will be large. If, on the other hand, the surface is out of focus because of an intervening clear plate, then the image will be blurred, and the number of distinguishable features will be substantially reduced.

However, it should be noted that other measures of the detail in the surface images could be utilized. For example, the average size or dimension of the objects extracted from the image could also be used as a measure of the level of detail in the image. Small objects are typically lost when the image is blurred, and hence, as the level of detail increases, the size of the smallest objects decreases.

In addition, algorithms based on the spatial frequencies in the observed images can also be utilized. A blurred image is equivalent to passing the unblurred image through a low pass filter. Hence, images that have a higher content of high spatial frequencies are also more detailed on average than images having a lower content of such frequencies. Relatively simple finite impulse response filters can be utilized to measure the spatial frequencies in the images.

Various modifications to the present invention will become apparent to those skilled in the art from the foregoing description and accompanying drawings. Accordingly, the present invention is to be limited solely by the scope of the following claims.

What is claimed is:

1. A pointing device comprising:
    an illumination system that illuminates a portion of a surface over which said pointing device travels with coherent light;
    an imaging system comprising a first window for receiving light from said illuminated portion of said surface and transmitting that light to a first imaging array such that a speckle pattern is generated on said first imaging array and a second window comprising an imaging optical system for forming an image of part of said illuminated portion of said surface on a second imaging array; and
    a controller that selects either the first imaging array without any imaging lens, or said second imaging array with an imaging lens, and compares the output of said selected imaging array at first and second times to determine a displacement indicative of the direction and distance said positioning device moved between said first and second times,
    wherein said first window of said imaging system is situated on a path for said light between said illuminated portion of said surface and said first imaging array, said imaging system not including any imaging lens on said path to provide said path that lacks said imaging lens so that said speckle pattern is not destroyed.

2. The pointing device of claim 1 wherein said illumination system comprises a laser diode.

3. The pointing device of claim 2 wherein said laser diode is a VCSEL.

4. The pointing device of claim 1 wherein said controller determines the level of detail in said image formed on said second imaging array.

5. The pointing device of claim 4 wherein said controller selects said first imaging array if said determined level of detail is less than a predetermined value.

6. The pointing device of claim 4 wherein said level of detail is determined by counting objects in said image formed on said second imaging array.

7. The pointing device of claim 4 wherein said level of detail is determined by measuring spatial frequencies in said image formed on said second image sensor.

8. A method for determining a distance and direction through which a device moved between first and second times, said method comprising:
    illuminating a portion of a surface over which said device travels with coherent light;
    forming an image of a portion of said illuminated surface at said first and second times at a second imaging array using a lens;
    forming a speckle pattern from light reflected by said illuminated portion of said surface at said first and second times at a first imaging array, including transmitting said light on a path without any imaging lens between said illuminated portion and said first imaging array so that said speckle pattern is not destroyed; and
    comparing either said speckle pattern at said first and second times or said images at said first and second times to determine said distance and direction.

9. The method of claim 8 further comprising determining a level of detail in said image formed at one of said first and second times and selecting said speckle pattern or said image at said first and second times for said determination of said distance and direction depending on said determined level of detail.

10. The method of claim 9 wherein said level of detail is determined by counting objects in said image formed on said second imaging array.

11. The method of claim 9 wherein said level of detail is determined by measuring spatial frequencies in said image at said first or second times.

\* \* \* \* \*